3,475,349
PREPARATION OF SUPPORTED IRON/TUNGSTEN CATALYST
Ross E. Van Dyke, Orinda, Calif., assignor to Shell Oil Company, New York, N.Y., a corporation of Delaware
No Drawing. Filed May 27, 1966, Ser. No. 553,314
Int. Cl. B01t 11/82, 11/78
U.S. Cl. 252—442                                6 Claims

ABSTRACT OF THE DISCLOSURE

The efficiency of tungsten incorporation into a refractory oxide hydrogel catalyst base is enhanced by contacting the hydrogel with tungsten ions in the presence of ferrous ions.

---

This invention relates to the preparation of catalyst compositions useful for carrying out hydrocarbon conversion. More particularly, the invention relates to the preparation of catalysts which are useful for carrying out the destructive hydrogenation of hydrocarbons.

Destructive hydrogenation by catalytic means, more commonly called hydrocracking, is old and well known to the art. Destructive hydrogenation of the hydrocarbon oil, usually a coal tar or a high-boiling petroleum fraction, such as gas oils or topped crude, generally is carried out at quite high temperatures and pressures of the order of 850° F. and 1500 p.s.i.g. and upward. Catalysts for the destructive hydrogenation of oils are generally a combination of hydrogenation and cracking components.

The cracking component is generally an acid-acting refractory oxide such as a siliceous cracking catalyst comprising silica in combination with alumina, magnesia, titania, zirconia and the like. The silica content is usually in the range from about 60% to 90% by weight. A particularly effective cracking component is the silica-alumina cracking catalyst comprising 60–90% silica and 40–10% alumina.

The hydrogenation component generally consists of one or more transitional metals, or their oxides or sulfides, such as a metal of Group I-B, Group VI-A or Group VIII. (Hubbard Chart, 1956 Edition, revised by W. F. Meggers, published by Welch Mfg. Co., Chicago, Ill.) Tungsten is an especially preferred Group VI component and is often used in combination with an iron group metal.

While the metal hydrogenation component(s) can be incorporated into the catalyst by impregnation of a decomposable salt of the metal onto the cracking component, it has recently been proposed to incorporate the metal hydrogenation component into a hydrogel of the refractory oxide cracking component. However, catalysts containing Group VI metals are difficult to prepare by the latter method since the metal is not readily taken up by the hydrogel.

It has now been found that tungsten is highly taken up by a hydrogel of the siliceous cracking component in the presence of ferrous iron. The use of ferrous ion is essential since with ferric iron the uptake of tungsten is relatively inefficient. Therefore, in accordance with one embodiment of the present invention, a hydrogel of a siliceous cracking catalyst, substantially free from sodium or other undesirable ions, is contacted in the presence of ferrous ion with a solution of a tungsten compound.

The preparation of a hydrogel of cracking catalysts, e.g., silica-alumina, is well known and is described by Ryland et al. "Catalysis VII," Emmett, 1960 Reinhold Publishing Co. Silica-alumina hydrogel can be prepared under alkaline or acidic conditions. In one procedure, an aqueous solution of sodium aluminate is added rapidly to a solution of sodium silicate in proper proportions to provide the desired concentration of silica and alumina in the catalyst. The pH of the mixture is brought to about 7 by the addition of a strong mineral acid, such as sulfuric acid to precipitate a hydrogel. Another method is to add a mineral acid, such as sulfuric or hydrochloric acid, to an aqueous solution of sodium silicate to bring the pH to 8–9. To the silica gel which forms is added a solution of aluminum sulfate, which is followed by neutralization to a pH of about 7 to precipitate the alumina.

The hydrogel is washed to remove undesirable ions such as sodium ions, sulfate ions and the like. This is done by filtering and reslurrying the hydrogel with water to which is added an agent which will react with, for example, sodium in the hydrogel to form a water-soluble salt. A number of such agents are known in the art, e.g. acids, acid salts, ammonium salts and the like. A preferred method for removing sodium is to use acidulated water having a pH of from about 2 to about 4. Wash solutions suitable for this purpose may be prepared by addition of small amounts of acids, such as sulfuric or hydrochloric, to water, or by demetallization of hard water. The washing can be carried out at ambient or slightly elevated temperatures, preferably not to exceed about 140° F. Normally, the washing comprises about two to twelve washing and filtering sequences, the number of sequences being determined by such things as the degree of mixing, the amount of sodium in the hydrogel and the desired degree of sodium removal. Preferably the sodium content of the finished cracking component is reduced to less than about 0.1% by weight.

The hydrogenation components are incorporated into the catalyst by contacting the hydrogel with an aqueous solution of a compound of the desired component. With iron, a compound wherein the iron is present as a cation, such as a sulfate, nitrate, chloride and the like, is used. In the present invention the iron must be present as a ferrous ion to provide efficient uptake of tungsten. When iron is incorporated into the gel structure as ferrous ion rather than as ferric ion, the gel adsorbs larger amounts of tungsten ion and with greater efficiency. The tungsten is incorporated into the gel simultaneously with or after the ferrous ion. Preferably, the ferrous ion and the tungsten are incorporated into the gel from a common solution, e.g. a solution comprising ferrous sulfate and ammonium tungstate. After the hydrogenation component has been incorporated into the gel, the gel is washed to remove excess solution. In general, the final catalyst comprises iron and tungsten in the range from about 0.1% to 20% by weight each.

Incorporation of fluoride into the hydrogel is especially preferred for it apparently results in a more stable catalyst, presumably through a more complete interaction of the metal ions with the gel, and is considered to enhance the effectiveness of the hydrogenation component and of the cracking component. To incorporate fluoride into the catalyst, hydrofluoric acid or a water-soluble fluoride compound such as ammonium fluoride, sodium fluoride, and the like can be used. The fluoride can be added to the hydrogel during or after formation of the hydrogel. Preferably the fluoride is added from a common solution with the hydrogenation metal component. The amount of fluoride incorporated in the catalyst is from about 0.1% to 5% by weight.

The hydrogel containing the desired added components is filtered and washed to remove any unreacted components. The filtered hydrogel, which contains about 10% solids, can be extruded with or without further adjustment of the water content, dried, and calcined to form the finished catalyst. Calcination is effected at a temperature in the range from about 800° to 1200° F.

EXAMPLE I

A silica-alumina hydrogel was prepared by diluting 376 grams "E" brand sodium silicate (app. 27% w. silica) to 2400 milliliters with distilled water. Sulfuric acid (3 molar) was added to the dilute sodium silicate to reduce the pH to 9 and the gel which formed was aged for 10 minutes. Additional sulfuric acid was added to reduce the pH to 8. After another 10 minutes, one liter of solution containing 209 grams $Al_2(SO_4)_3 \cdot 18H_2O$ was added to the silica with rapid stirring and sufficient ammonium hydroxide was then added to raise the pH to 5 to precipitate the alumina. The resulting silica-alumina hydrogel was filtered and washed with acidulated water ($H_2SO_4$ pH of 3) to remove sodium ions. To remove sulfate ions, an aqueous slurry of the hydrogel was adjusted to pH 7 with ammonium hydroxide solution and filtered.

The washed hydrogel was slurried in 2 liters of solution containing 9 grams $(NH_4)_2W_4O_{13} \cdot 8H_2O$ and 10.3 grams $NH_4F$ for a period of two hours. The hydrogel was filtered, washed with distilled water to remove unreacted salts, dried and calcined at 550° C. The final catalyst contained, on a weight basis, 0.1% W and 2.5% F. The amount of tungsten taken up by the hydrogel amounted to only about 2% of the available tungsten in the solution.

Another catalyst was similarly prepared; however, the metal salt solution contained 30 grams $FE(NO_3)_3 \cdot 9H_2O$, 8 grams $NH_4F$, and 8 grams $(NH_4)_2W_4O_{13} \cdot 8H_2O$. The final catalyst contained 2.5% Fe, app. 2.5% F, and 3% W, which corresponds to a tungsten uptake from solution of 68%.

Another catalyst was similarly prepared using a metal solution containing 35 grams $FeSO_4 \cdot (NH_4)_2SO_4 \cdot 6H_2O$, 10 grams $NH_4F$, and 10 grams $(NH_4)_2W_4O_{13} \cdot 8H_2O$. The final catalyst contained 2.9% Fe, app. 2.5% F, and 4.1% W, which corresponds to a tungsten uptake from solution of 80%.

EXAMPLE II

A washed hydrogel prepared in the manner described in Example I was slurried in 2 liters of solution containing 35 grams ferrous ammonium sulfate and 10 grams of ammonium fluoride. After one hour, a solution of 25 grams ammonium molybdate in one liter of solution was added to the slurry. After one hour, the hydrogel was filtered, washed twice with distilled water, dried and calcined at 550–600° C. The amount of molybdenum taken up by the hydrogel amounted to only approximately 9% of the available molybdenum in the solution.

When the above iron, molybdenum and fluoride salt solutions are mixed, precipitation occurs. This demonstrates that the salts are incompatible and cannot be incorporated into the hydrogel from a common solution.

It can be seen from the results in the above examples that when iron is incorporated into the hydrogel as ferrous ion, the gel takes up a larger amount of tungsten and with greater efficiency. Although the above catalysts have been made with fluoride, a similar result is to be obtained without the fluoride. With molybdenum, uptake into the hydrogel is exceedingly small compared with the uptake for the tungsten.

I claim as my invention:

1. A method of impregnating a support which comprises contacting a hydrogel of a refractory oxide with an aqueous solution of a heat decomposable tungsten compound in the presence of a ferrous salt.

2. The method of claim 1 wherein the solution consists essentially of both ferrous salt and the tungsten compound.

3. The method of claim 1 wherein fluoride is incorporated into the hydrogel by adding a water-soluble inorganic fluoride salt or hydrofluoric acid.

4. The method of claim 1 wherein the refractory oxide is silica-alumina cracking catalyst.

5. The method of claim 4 wherein fluoride is incorporated into the hydrogel by adding a water-soluble inorganic fluoride salt or hydrofluoric acid.

6. The method of claim 5 wherein the final catalyst comprises from about 0.1% to 20% by weight each of iron and tungsten and about 0.1% to 5% by weight fluoride.

References Cited

UNITED STATES PATENTS

| | | | |
|---|---|---|---|
| 3,332,886 | 7/1967 | Wilson | 252—442 |
| 3,202,480 | 8/1965 | Nixon | 23—143 |
| 3,112,351 | 11/1963 | Hoekstra | 260—683.75 |
| 2,739,132 | 3/1956 | Riedl | 252—439 |
| 3,004,929 | 10/1961 | Lucas | 252—442 |

PATRICK P. GARVIN, Primary Examiner

U.S. Cl. X.R.

252—438, 440, 441, 455, 470